(No Model.) 6 Sheets—Sheet 1.

J. HOGARTH.
MECHANISM FOR TESTING AND RECORDING PROPERTIES OF FLOUR.

No. 529,175. Patented Nov. 13, 1894.

WITNESSES
George Baumann
James Gracie

INVENTOR
James Hogarth
By his Attorneys
Howson & Howson (No Model.) 6 Sheets—Sheet 2.

J. HOGARTH.
MECHANISM FOR TESTING AND RECORDING PROPERTIES OF FLOUR.

No. 529,175. Patented Nov. 13, 1894.

WITNESSES
George Baumann
James Gracie

INVENTOR
James Hogarth
By his Attorneys
Howson & Howson (No Model.) 6 Sheets—Sheet 3.

J. HOGARTH.
MECHANISM FOR TESTING AND RECORDING PROPERTIES OF FLOUR.

No. 529,175. Patented Nov. 13, 1894.

WITNESSES
George Baumann
James Gracis

INVENTOR
James Hogarth
By his Attorneys
Howson & Howson (No Model.) 6 Sheets—Sheet 4.

J. HOGARTH.
MECHANISM FOR TESTING AND RECORDING PROPERTIES OF FLOUR.

No. 529,175. Patented Nov. 13, 1894.

WITNESSES
George Baumann
James Gracie

INVENTOR
James Hogarth
By his Attorneys
Howson & Howson (No Model.)  6 Sheets—Sheet 5.

J. HOGARTH.
MECHANISM FOR TESTING AND RECORDING PROPERTIES OF FLOUR.

No. 529,175.  Patented Nov. 13, 1894.

WITNESSES
George Baumann
James Gracie

INVENTOR
James Hogarth
By his Attorneys
Howson & Howson

UNITED STATES PATENT OFFICE.

JAMES HOGARTH, OF KIRKCALDY, SCOTLAND.

MECHANISM FOR TESTING AND RECORDING PROPERTIES OF FLOUR.

SPECIFICATION forming part of Letters Patent No. 529,175, dated November 13, 1894.

Application filed June 30, 1892. Serial No. 438,518. (No model.) Patented in England April 20, 1891, No. 6,784, and in Belgium March 16, 1892, No. 98,851.

*To all whom it may concern:*

Be it known that I, JAMES HOGARTH, miller and corn merchant, a subject of the Queen of Great Britain and Ireland, of West Mills, Kirkcaldy, Fifeshire, Scotland, have invented certain Mechanisms for Testing and Recording the Properties of Flour, of which the following is a specification.

Patents have been obtained for said invention in Great Britain, No. 6,784, dated April 20, 1891, and in Belgium, No. 98,851, dated March 16, 1892.

This invention has reference to and comprises certain improvements upon the means and appliances used in my system of testing and recording the characteristic properties of flour described in the specification of my Patent No. 474,636, dated May 10, 1892, and has mainly for its object to simplify and improve the construction and action of said appliances and render them more beneficially useful; and in order to enable others skilled in the art to which my invention relates to understand how it may be carried into practice, I have hereunto appended explanatory drawings in which the same reference letters are used to indicate corresponding parts in all the figures where shown, and so far as possible to corresponding parts and their letters of reference in the specification of the said former patent, so that many of these parts will not herein require to be particularly described.

Figures 1 and 2 are a sectional elevation and a plan, and Figs. 3 and 4 transverse sections taken near the lines 3—3 and 4—4 respectively of Figs. 1 and 2 illustrating an improved simplified form of flour testing machine;
Figs. 7 and 8 show front and end sectional elevations of mechanism used for feeding water to the kneading machine,
and Fig. 9 shows a detached end elevation of the indicating dial mechanism.
Figs. 10 and 11 show sectional elevations of water feeding mechanism, and Fig. 12 an elevation of a portable parallel rod used for displacing the water during the testing operations.
Figs. 13 and 14 are a front elevation and plan of the kneading mechanism.

Figure 1:
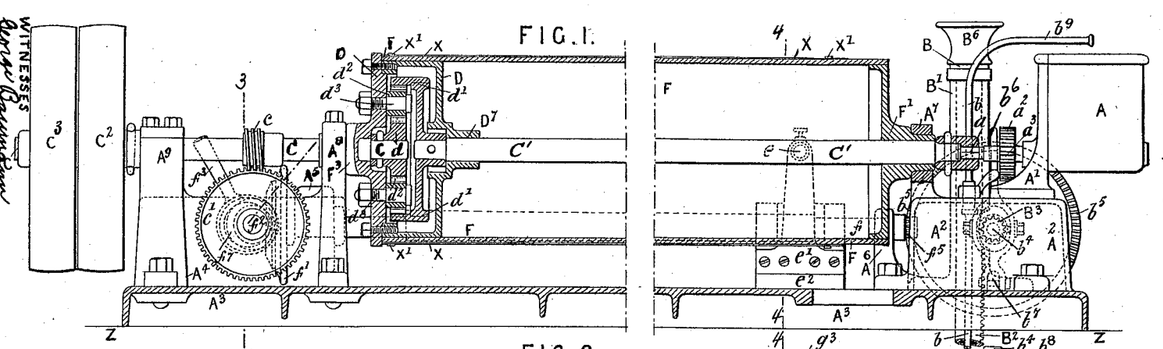
Figure 2:
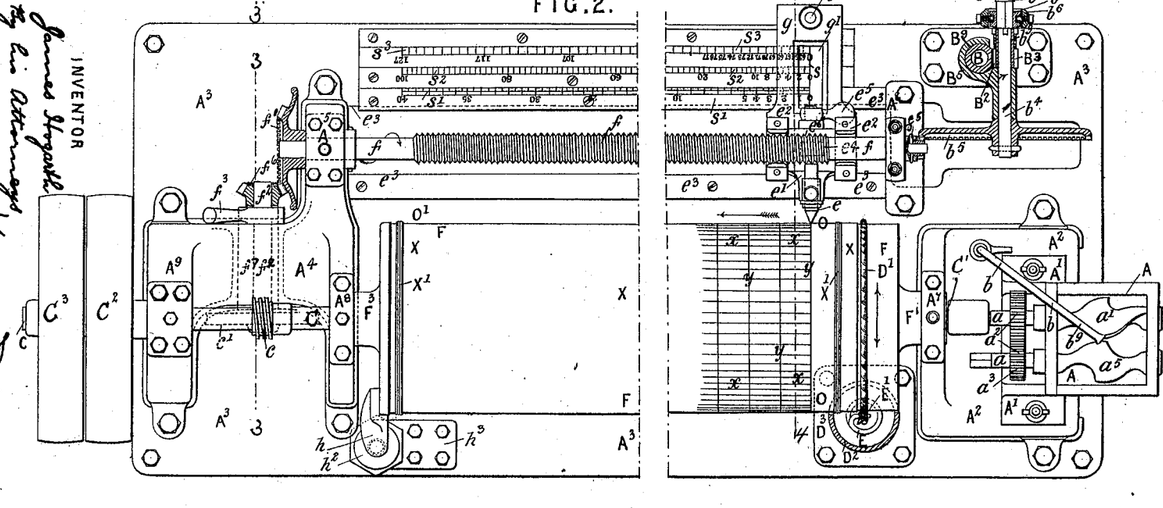
Figure 3:
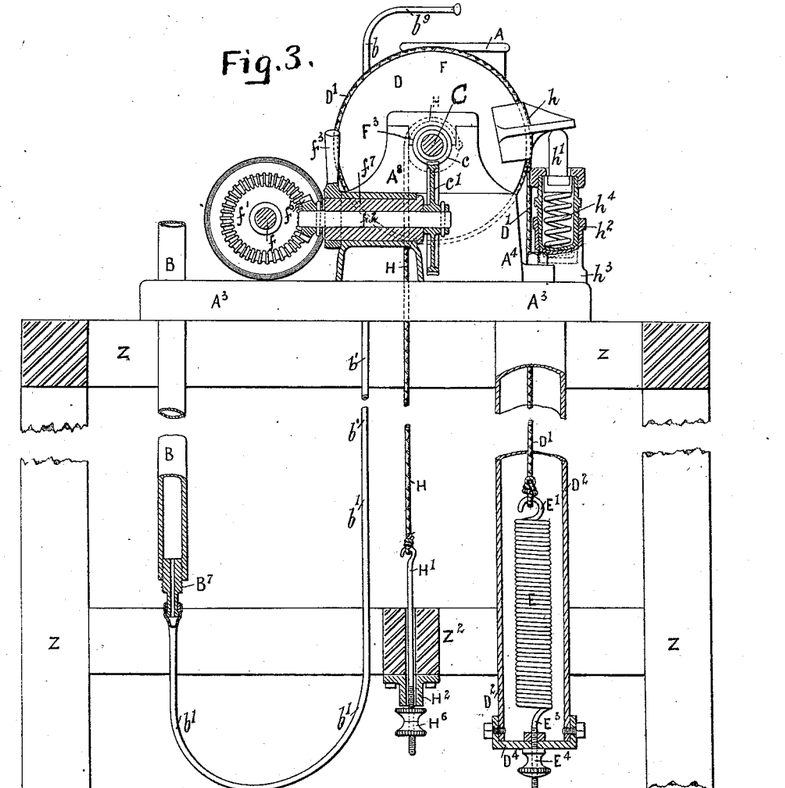

Referring to Figs. 1 and 2 the improvements consist first in dispensing with a separate diagram cylinder F used in my said former patent, and converting the dynamometer D into a combined long diagram cylinder F and dynamometer D, fitted preferably in its one end as shown in Fig. 1. Either the bevel or the spur gear constructions described in reference to Figs. 6, 7, 8, and 9 respectively of the specification of said former patent the latter of which I have shown here as fitted in the one end of the cylinder F might be used. This cylinder F, Figs. 1 to 4, is oscillated through the dynamometer D, the first and second motion shafts C, C' being rotated loose in pillow blocks $A^7$, $A^8$. In carrying this arrangement into practice, I mount the whole on a light rectangular hollow plate frame $A^3$, preferably secured on the top of a wooden open frame Z, of a convenient height off the floor Z', for the operator to work the machine, as seen more particularly in the end section Fig. 3. On one end of the frame $A^3$ I mount the kneading machine A, by its end bracket A', to the pillow block frame $A^2$, $A^7$, screwed direct to the one end of the plate frame $A^3$. The bearing block $A^7$, carries one boss end F', of the diagram cylinder F, which also answers as the end journal bearing of the shaft C', which drives the spindles $a\,a$ of the kneading machine A. The other end of this shaft C' is carried in the inner boss $D^7$ of the case of the dynamometer D and secured to the internal toothed wheel d' of the dynamometer D. The small pinion d of the dynamometer D, is secured on the inner end of the first motion shaft C, rotating loose in the end boss $F^3$ of the cylinder F. This first motion shaft C is carried in the bearing pillow blocks $A^8$, $A^9$, projecting up from the end standard piece $A^4$ secured to the other end of the base plate $A^3$, the shaft C being provided with fast and loose pulleys $C^2$, $C^3$. The adjustable helical spring E, as shown more particularly in Fig. 3, is here mounted in a vertical tube $D^2$ secured at $D^3$ to the frame $A^3$ and the end $E^3$ of the spring E is secured to the lower end $D^4$ of the tube $D^2$, by an adjustable nut $E^4$. The other moving end E of the spring has one end of the cord $D'$ attached to it which cord is carried up and passed round and attached to the cylinder F. Thus while the first motion shaft C, is driven at a regular speed the diagram cylinder F is turned or oscillated more or less according to the power taken to drive the kneading machine A.

The marking pencil $e$, Figs. 1 to 4 and 20, travels at a slow uniform rate of speed longitudinally across the diagram paper X, X by means of a screw spindle $f$ carried in bearing blocks $A^5$, $A^6$ secured to the bed plate $A^3$, the block $A^5$ being formed on the bracket $A^4$. The spindle $f$ may be driven by a bevel wheel $f'$ and pinion $f^6$ the former secured on the end of the screw shaft $f$, and the other on a transverse spindle $f^2$ which is carried in an eccentric bush bearing $f^7$ mounted in the bracket $A^4$. This bearing $f^7$ is turned by a handle $f^3$ to put the wheels $f'$ and $f^6$ into or out of gear with each other. The other end of the spindle $f^2$ has mounted thereon a screw-wheel $c'$ gearing into a screw $c$ on the first motion shaft C so as to drive the screw spindle $f$ at a slow uniform rate, and thus move the pencil $e$ parallel to the axis of the dynamometer cylinder F across the lines $y\ y$ on the divided paper, secured on the cylinder F. This would give line diagrams with the zero line at O O', the lines varying according to the stiffness of the dough and power required to drive the mixer A. The cord $D'$ and spring E are connected tangentially direct from the dynamometer D, or cylinder F, without the separate diagram barrel and its gearing, required in the arrangement described in the specification of the former patent.

Figure 4:
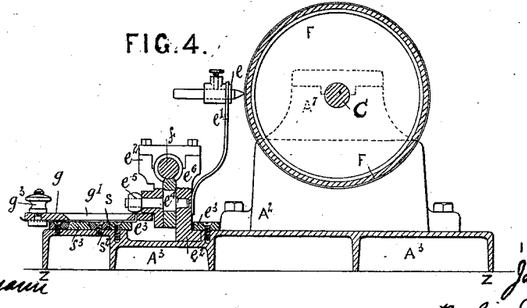

The pencil $e$ is carried on the upper end of a spring blade $e'$ (Figs. 1, 2, and 4), having its lower end secured to a slow moving side bracket $e^i$ working in a long planed guide $e^3$ in the bed plate $A^3$, as seen particularly in Figs. 2 and 4.

Figures 15, 16, 17, 18, 19, 21:
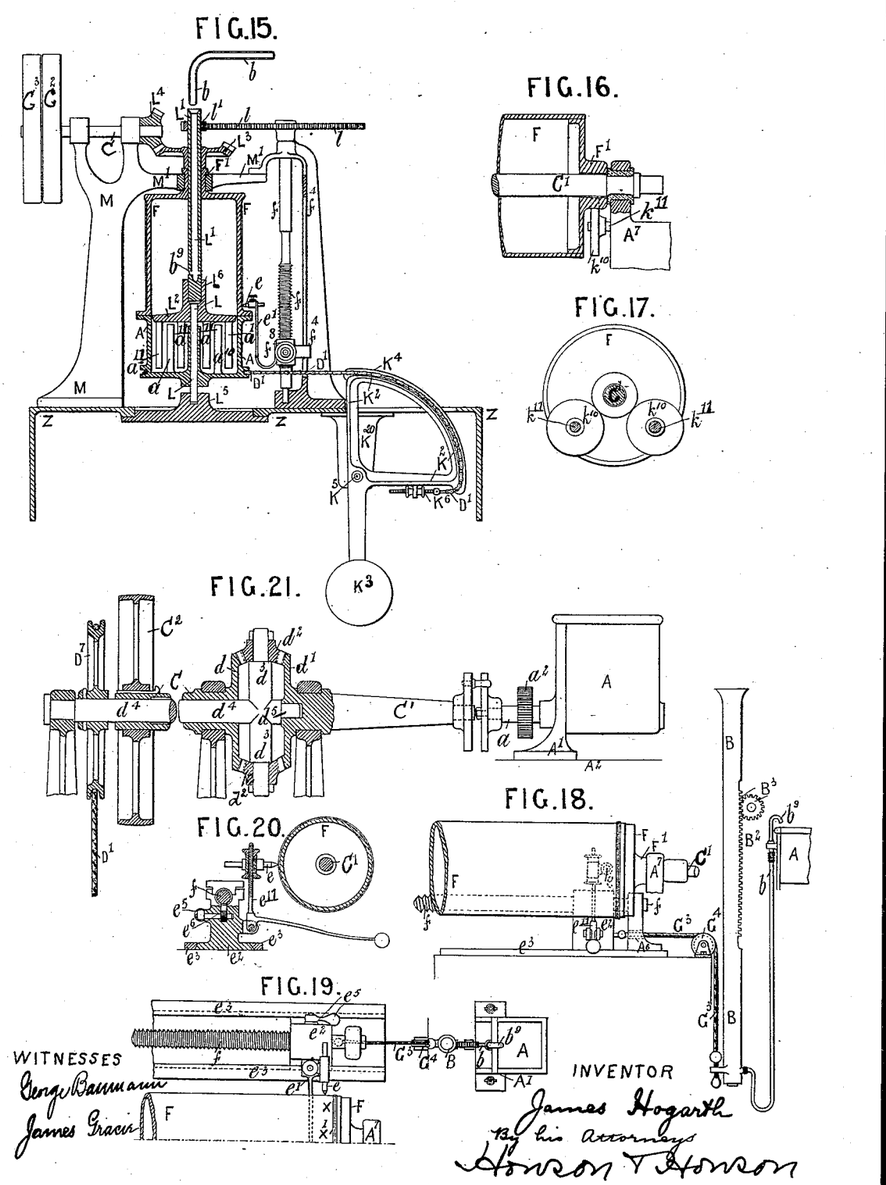
Fig. 15 is a sectional elevation of a modified form of kneading machine.
Figs. 16 and 17 are a side section and end view of the diagram barrel and fittings.
Figs 18 and 19 show side and plan views, and Fig. 20 an end view of recording mechanism.
Fig. 21 is a sectional elevation of an improved form of dynamometer.

In Figs. 18, 19 and 20 is shown a slight modification in which the spring blade $e'$ is replaced by a weighted lever $e''$. The upper arms of this bracket $e^2$, Figs. 2, 4, 18, 19, and 20 are steadied by bush eyes on the outer circumference of the screw of the spindle $f$ and a screw bush $e^6$, to work into this thread is mounted between these arms of the bracket $e^2$ on an eccentric spindle $e^4$, with a small weighted handle $e^5$ on one end, which when turned in one direction keeps this bush always into gear with the screw thread of the spindle $f$. Referring to Figs. 2 and 4, this traversing bracket $e^2$ carries a lateral horizontal index plate $g$, with an open recess $g'$ in it fitted with a sheet of mica or glass. In line with the pointer $e$, across the mica or glass, a hair or fine wire $s$ is stretched and tightened up by the pinching screw at $g^3$ to pass over one or more fixed or adjustable divided scales $s'$, $s^2$, $s^3$, mounted on the bed plate $A^3$ just below the traversing plate $g$, $g'$ to set the pencil $e$ to start forming the graphic diagram at zero on these scales and the paper, and by the hair line $s$ read on the scale the space traversed and time taken by the pencil, and the quantity of water used, as will hereinafter be described. Thus in this arrangement, Figs. 1 to 4, it will be seen that the diagram paper X which is mounted by india rubber bands $X'$, or other equivalent, at its ends to the cylinder F, requires to have its wide equidistant division lines $y$, $y$ formed on the paper in the transverse direction round the cylinder F at right angles to its axis starting from the zero line O O' on the paper, which indicates the time taken to form the diagram, and also the water added to the sample of flour being treated in the mixer A, during that time, while the pencil is moving at a regular speed parallel to the zero line O, O' across these lines $y\ y$. While the closer equally divided lines $x$, $x$ are or may be formed on the diagram paper equidistant from the parallel to the zero line O, O' and axis of the cylinder F, and indicate the varying power exerted while the pencil $e$ is forming the undulating graphical diagram across these lines by the varying oscillation of the cylinder F. These lines and divisions $y$, $y$ and $x$, $x$ may or may not be first put on the paper to suit the scales and tables it is determined to work the machine and all the samples of flour upon, as described in my said former patent, as plain paper may be put on the moving barrel or surface, and the zero lines or points only put on the paper at starting by the pencil $e$ itself; and have the last or maximum or any desired intermediate of these time and pressure lines put on by the pencil $e$ after finishing the diagram according to the scale used as say $s'$ which is shown as divided to indicate the number of cubic centimeters of water added regularly to the sample of flour in the mixer A, as say forty grams during the time the pencil $e$ and index line $s$ are traversing to any division on the scale $s'$ up to thirty-five or forty centimeters.

The scale $s^2$ is or may be divided to indicate the percentage of water required to be added to the sack of flour, and scales $s^3$, in like manner can be divided to indicate the number of loaves of a desired fixed weight to be obtained from the sack of flour of any particular sample of flour that may be taken or indicated by the scales $s'$ used; but of course other scales may be used, and tables may be made out and printed for use instead of the scales $s^2$, $s^3$; but whichever are used they must be made out from tested experience gained from the form of and power and maximum pressures indicated by the diagrams and which gives the relative qualities of the flours as to the gluten and starch in them.

Another improvement consists in various simple arrangements of the fittings in connection with the vertical parallel cylinder of water for delivering a uniform quantity of water from same and feeding it to the dough mixer A, and sample of flour in it, during the time of taking the diagrams. One way of doing this consists in mounting the parallel measuring cylinder B, to move vertically within a stationary steadying bracket $B^5$, screwed to the sole plate $A^3$ (Figs. 1, 2, and 3). This cylinder B has an open funnel filling mouth $B^6$ at top, and has its lower end connected at $B^7$ to a small rubber or other elastic tube $b'$, which tube $b'$ has its other end connected to the lower end of the stationary small metal tube $b$ which supplies water to the kneading machine A, this elastic moving tube $b'$ acting as an inverted U-shaped siphon, as seen particularly in Fig. 3, the upper delivery end $b^9$, of the tube $b$, always determining the height of the water in the moving cylinder B. The cylinder B is moved upward at a uniform rate from its lowest position shown in Fig. 1, when filled with water at the filling mouth $B^6$ to deliver the water regularly therefrom. This upward movement is made by forming a toothed rack $B^2$, Figs. 1 and 2, on its one side, actuated by a pinion $B^3$ so mounted on a shallow spindle or sleeve $b^8$ carried on a driving spindle $b^4$, rotating in bearings in the standard $B^5$, as to be driven by the spindle $b^4$. The bevel or face wheel $b^5$ on one end of the spindle $b^4$ is actuated by a small pinion at $f^5$ on the overhung end of the slow motion screw shaft $f$. The water cylinder B is thus raised and delivers the water from the pipe $b$, $b^9$ into the dough mixer slowly and at a uniform rate. The screw spindle $f$ is turned to move the pencil $e$ in the direction of the arrow across the cylinder F in Fig. 2. A hand lever $b^6$, fulcrumed at its lower end $b^7$, is connected to a grooved clutch ring $b^8$ at the center by pinching screws; and this clutch slides on the squared end of the spindle $b^4$ and takes into the hollow spindle $b^3$ of the pinion $B^3$, so as to engage or disengage the pinion $B^3$ and the spindle $b^4$, as the lever $b^6$ is shifted in either direction.

In some cases the cylinder F has a tendency to recoil suddenly backward with the power of the helical spring E when the power required to drive the kneading machine A is suddenly released. To prevent this shock to the cylinder F, and its overrunning the action of the spring E and the cord $D'$, by one arrangement as shown in Figs. 2 and 3, I mount a stop bracket $h$ on one end of the cylinder F over the stem $h'$ of a helical spring $h^4$ mounted in an adjustable cylinder case $h^2$ secured at $h^3$ to the base plate $A^3$; or a piston and air cylinder could be used instead of the spring $h^4$ which arrangement stops the cylinder F gently and prevents this over recoil. Another means of accomplishing the same result is seen in the sectional elevation, Fig. 3, and consists in securing one end of a cord H, to the boss $F^3$ of the cylinder F, and winding it a half turn or so in the reverse direction to that in which the cord $D'$ of the spring E, is wound round the cylinder F and in securing the lower end of the cord H to an adjustable screw spindle $H'$ passed through a fixed rubber or other elastic ring $H^2$, with adjustable hand screw nut $H^6$ below. This rubber elastic ring $H^2$ acts to prevent this over back recoil of the cylinder F.

Instead of using a spiral, helical, or coiled spring E, to act against the power of the dynamometer D to give approximately divided distances on the graphical diagram paper, proportionate to the force in pounds exerted in mixing the dough, and indicated by the dynamometer as described in reference to the previous figures hereof and in the specification of the said former patent, by further improvements I accomplish this more accurately by improved arrangements of an accumulative weight or weights.

Figure 5:
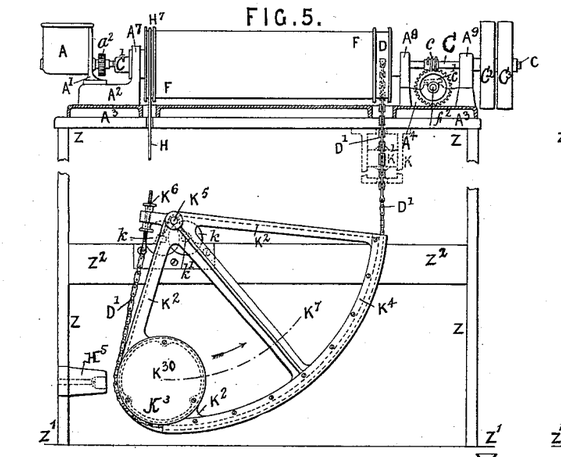
Figs. 5 and 6 show front and end sectional elevations of a modified form of a flour testing machine.
Figure 6:
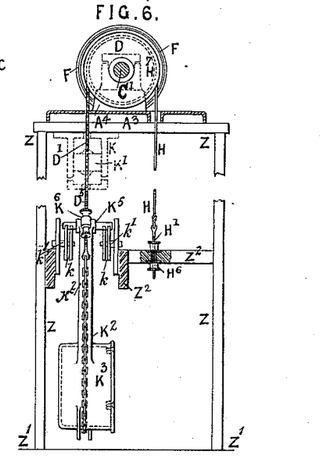

Referring to Figs. 5 and 6, these show views of one of my flour testing machines, analogous to that shown in Figs. 1 and 2, but as fitted with an arrangement of improved weight levers. This arrangement consists in mounting on the frame Z, below the sole plate $A^3$, a cylinder K and attaching a cord or preferably a chain $D'$ wound round the barrel F, to a form of piston $K'$ working in the cylinder K (which cylinder is a little larger in diameter than the piston) as indicated in dotted lines in these figures. This cylinder K would be open at the upper end and closed at the lower end to act as a steadiment and air cushion for preventing jar in the working of the piston and cord while the different strains were on it. A cord or chain $D'$ from the lower side of this piston $K'$ would pass through a small hole in the bottom of the cylinder K, tangentially down to and round an oscillating grooved quadrant $K^2$ mounted on a transverse boss and spindle $K^5$. The quadrant $K^2$ is provided with radial arms or webs leading down to a weight $K^3$, mounted on the quadrant below the fulcrum spindle $K^5$, in its normal inactive zero position as shown in this position in the figures. The chain $D'$ would preferably be carried round and up the back web or arm of the quadrant $K^2$, and secured to a bracket near the fulcrum by an adjustable small crew spindle $K^6$, and securing jam nuts to bring all to their normal zero position for starting the diagram on the barrel F of the dynamometer D.

Figure 7:
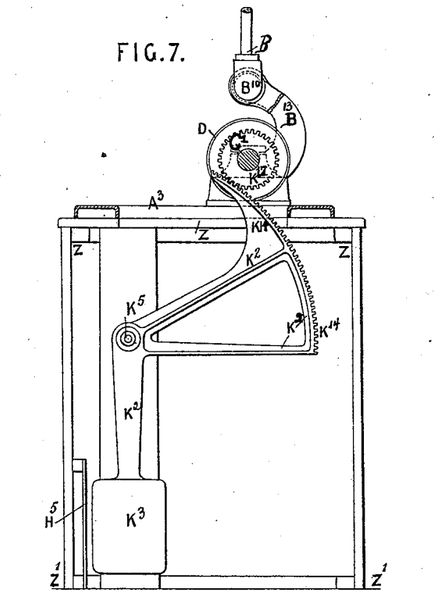
Figures 8, 9:
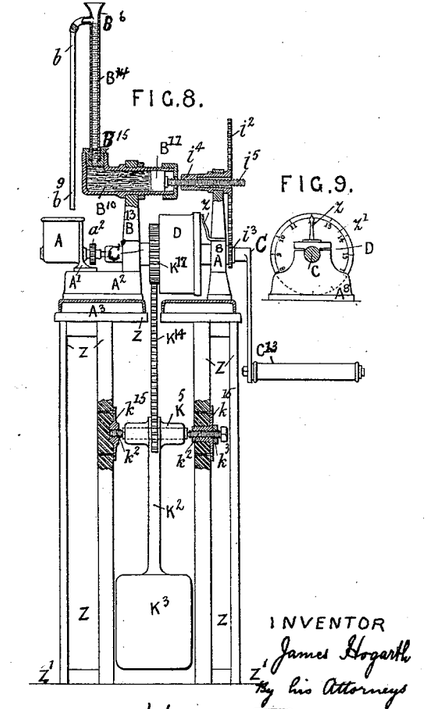

The grooved quadrant $K^2$ might be formed in various ways as by turning the segmental web of the quadrant and mounting or securing on its side segmental plates $K^4$, to form the groove for the chain $D'$; and the boss of the quadrant would be mounted on a steel spindle $K^5$, mounted to oscillate on antifriction rollers $k$, carried on studs in brackets $k'$ secured to horizontal bars $Z^2$ of the frame Z; or as shown in Figs. 7 and 8, the spindle $K^5$ of the differential weighted segment $K^2$ might be mounted on fine steel centers of screw studs $k^2$ screwed into brackets $k^5$ in the frame Z, and have jam nuts $k^3$.

When the machine was started and the dough increased in stiffness, the dynamometer D would wind up the cord and turn the quadrant and weight up, the weight always increasing as it rose from the normal position below the fulcrum toward the tangential position of the cord under the cylinder as indicated by the dotted lines $K^{30}$, $K^7$, in Fig. 5; but by preference the quadrant $K^2$ would be made of such a size that it and the weight $K^3$ and chain $D'$ would not require to turn more than sixty degrees upward from the vertical position so as to give approximately equal distance of leverage for equal pounds of pressure of increase in weight. A cord H, Fig. 6, is preferably wound round a grooved pulley $H^7$ on the diagram cylinder F in the opposite direction to that of the said weighted chain $D'$, as before described, and have a screw spindle $H'$ at its free end passed through a fixed bracket or part of the frame $Z^2$ with adjustable securing nuts $H^6$ on it, either with or without an india rubber or spiral spring $H^2$ at its end, as shown in Fig. 3, below the bracket, to act and maintain the barrel or dynamometer at its said normal zero position, and check the recoil action of the weight and quadrant. This spring would come into action as the weight $K^3$, on the cord $D'$ and the quadrant lever $K^2$ fell to its normal lowest zero position and prevent any sudden jerk of the weight and barrel in their back reaction to this position and this arrangement would be suitable for any or all of the accumulative weights or the springs; or this weighted lever $K^2$ might come back against a stretched rubber disk or cushion $H^5$ secured to the side of the frame Z.

Instead of using a chain $D'$, a toothed segment $K^{14}$ may be mounted round the periphery of the quadrant $K^2$, as shown in Figs. 7 and 8, and this toothed segment $K^{14}$ works up through a slot in the bed frame Z of the machine, and gears into a corresponding toothed wheel $K^{17}$, on the case of the dynamometer D or on the second motion shaft $C'$ actuated through the pinions of the dynamometer. This arrangement is very suitable for the simple arrangement of attaching the dynamometer direct to the spindle $C'$ of the dough mixing vessel A, without a separate indicating diagram barrel, and suitable for being driven by a crank handle $C^{13}$, on the spindle C, of the dynamometer as shown instead of the belt pulleys $C^2$, $C^3$ of the former arrangements; and a fixed radial pointer $z$ may be attached to one of the bearing brackets $A^8$ or other fixed part of the frame, and have the divisions of pounds shown at $z'$, cut or indicated on the radial end of the dynamometer barrel D, or on its outer periphery at one side as shown in the detached end view Fig. 9. In Figs. 7 and 8 is also shown part of the mechanism for another arrangement for feeding the water to the kneading machine A. In this arrangement a toothed wheel $i^2$ is turned by a pinion $i^3$ on the first motion shaft C of the dynamometer D, and is made to turn a screw nut $i^4$ on the screw spindle $i^5$ mounted on the outer end of a liquid tight piston $B^{11}$ working in a bored steel or other metal cylinder $B^{10}$ filled with mercury, the cylinder $B^{10}$ as well as the screw end of the spindle and the nut being carried on brackets at $B^{13}$ in the axial line of the cylinder. The inner end of the cylinder $B^{10}$ is fitted with a vertical stuffing box $B^{15}$ and parallel small glass tube $B^{14}$ for containing water on the top of the mercury. This tube $B^{14}$ is filled by a small funnel $B^6$ at the top of the tube, which a little below the top has a delivery branch $b$, $b^9$ for delivering the water into the vessel of the dough mixer A; and as the piston $B^{11}$ is regularly and slowly screwed into the cylinder $B^{10}$, the mercury will rise up in the glass tube $B^{14}$ at a uniform rate and deliver the water also uniformly into the dough mixer A. The glass tube $B^{14}$ is divided and marked lineally into inches or fractions of inches on one side, and the rise of the surface level of the mercury will show the amount delivered during any period of the regular turning of the machine.

Figure 10:
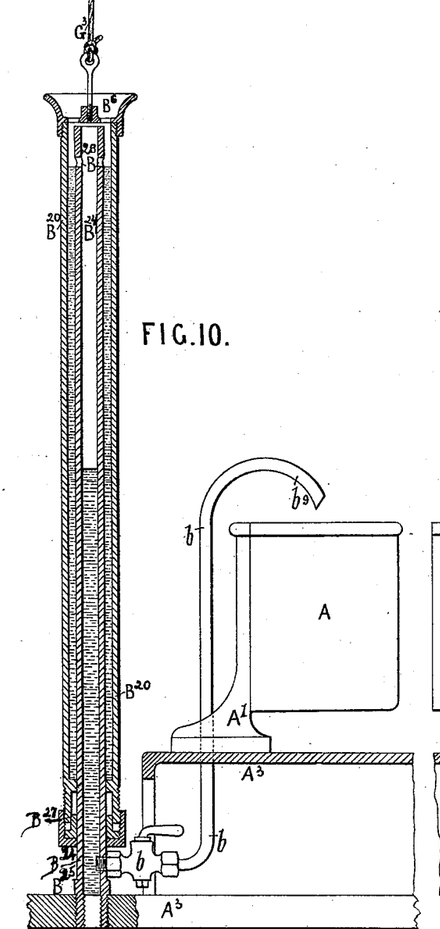

Fig. 10 shows an arrangement of the parallel vertical water cylinder and its fittings, in which the measuring cylinder $B^{20}$ is mounted to reciprocate water tight (by a stuffing box $B^{27}$ at its lower end) on a small fixed internal parallel tube $B^{24}$, secured at its lower end $B^{25}$ to the sole plate $A^3$ and connected by a lateral branch and cock below the stuffing box $B^{27}$ of the water cylinder $B^{20}$, to the fixed tube $b$, $b^9$ which delivers the water into the kneader A. The inner tube $B^{24}$, has small holes $B^{28}$, near its top, through which the water flows from the outer cylinder $B^{20}$, as it is raised by the cord $G^3$, the cord in this case being connected to the open filler end $B^6$, of the cylinder B to raise it. The level of the water in the inner tube $B^{24}$ is always that of the delivery nozzle $b^9$.

Figures 11, 12:
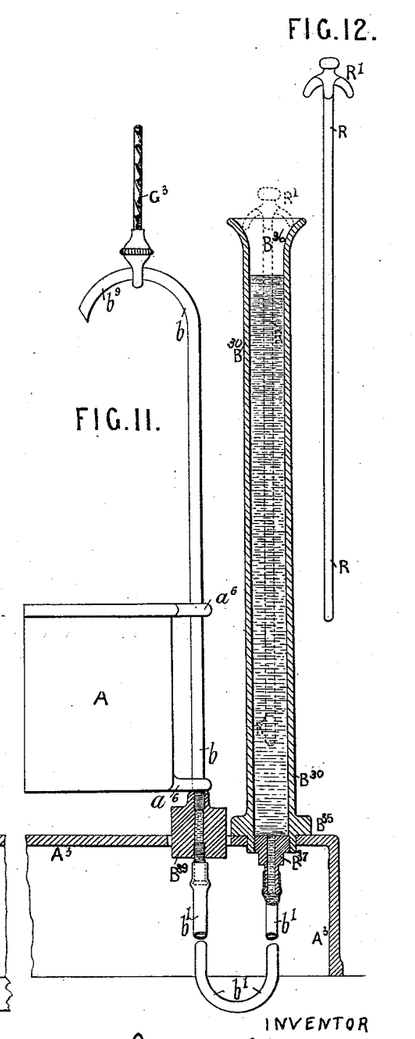

Fig. 11 shows a water feeding arrangement in which the cylinder $B^{30}$ is shown as fixed vertically at $B^{35}$ at its lower close end to the soleplate $A^3$, with a small nipple branch at $B^{37}$ to which one end of the flexible U-tube $b'$ is attached, the other end being attached by a branch nipple to a weighted coupling $B^{39}$, connected to the lower end of the delivery tube $b$, $b^9$, which in this case is made to move in parallel guides $a^6$ projecting from the side of the kneading chest A, instead of moving the cylinder B as in the first case. The upper delivery end $b^9$ of this tube $b$ is connected to the lower end of the lowering and raising cord $G^3$; this cord being wound round any pulley or cylinder driven at a uniform rate by the gearing during the taking of the diagram and a revolution of the cylinder F, so as to lower the tube $b$, $b^9$ and deliver the water from the cylinder $B^{30}$ at a slow uniform rate by the nozzle $b^9$ into the kneader A, the level of the water falling in the cylinder $B^{30}$, as the nozzle $b^9$ is lowered, or this lowering of the cord might be effected as described further on in reference to Fig. 18. Fig. 12 shows an elevation of a portable parallel rod or spindle R, which may be of any suitable diameter for insertion into any of the water cylinders preferably of the vertical class as shown dotted in in Fig. 11 with a band and cruciform top for resting in the funnel end of these water cylinders for varying the area and giving any regular displacement of the water from these cylinders during the testing of a sample and taking of a diagram.

In the case in which the pencil $e$ is moved by a slide frame $e^2$, and screw $f$ at a uniform speed as shown in Figs. 1, 2, and 4, and as modified and shown in partial side plan and end views in Figs. 18 to 20, one end of the cord $G^3$ may be attached to this traversing frame $e^2$ and brought over a guide pulley $G^4$, Fig. 18, with its other end attached to the lower part of the delivery water tube B to raise it direct and deliver the water regularly from the tubes $b$, $b^9$ into the kneading vessel A, instead of by the rack and pinion $B^2$, $B^3$, described and shown in reference to Figs. 1 and 2.

Figure 13:
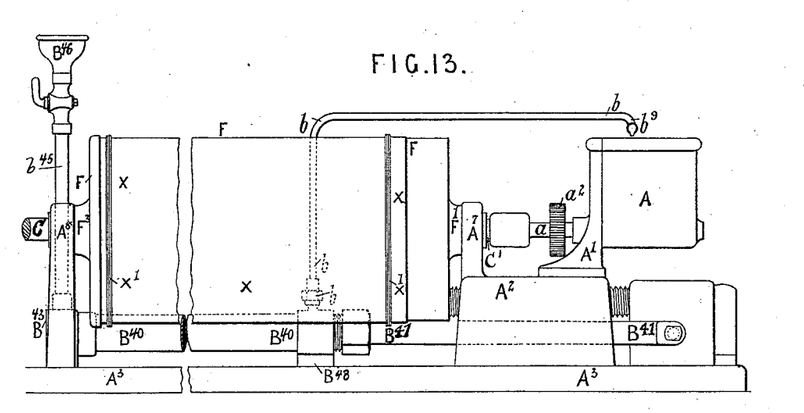
Figure 14:
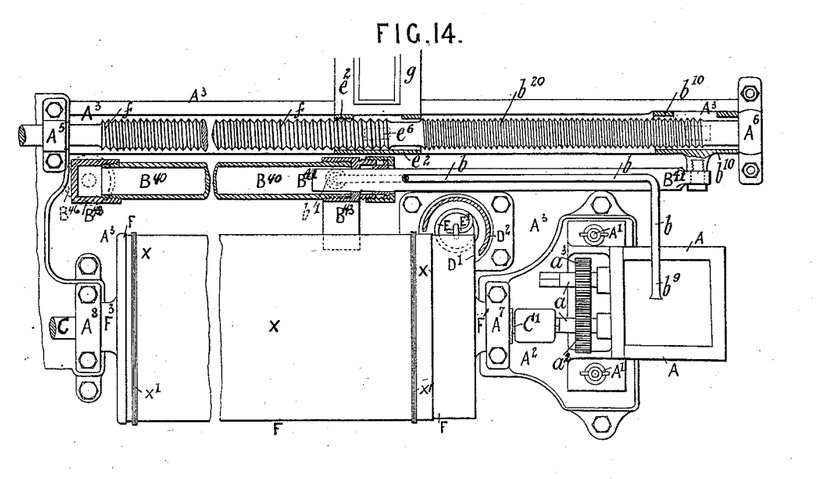

As shown in Figs. 13 and 14 the screw spindle $f$ may be elongated and have a finer pitch screw at $b^{20}$ formed on it so as to move a screw bush socket $b^{10}$ formed with a lateral stud so as to actuate a parallel piston or plunger $B^{41}$ working in a stationary horizontal water supply cylinder $B^{40}$ secured at $B^{43}$ to the soleplate $A^3$, so as to discharge the water at a uniform rate through the tube $b'$, $b$, $b^9$ to the kneading vessel A; and formed with a filler $B^{46}$ and filling tube and tap $b^{45}$ at the other end of the cylinder F, analogous to that shown in Figs. 1 and 2 of the specification of the aforesaid patent, but actuated in this way direct without the complicated gearing of wheels and pinions shown in that arrangement. The diagram may be moved horizontally and the pencil reciprocate over its surface, or the diagram may be stationary and the pencil traverse horizontally and vertically over it.

As shown in Fig. 15 I construct the kneader A in the form of a deep hollow vessel A, F of cylindrical shape, with an annular series of vertical pins or blades $a^{10}$ projecting up from its bottom part and mounted loose by a deep eye on the lower end of a vertical spindle L, L', working in a footstep bearing at $L^5$ bolted to the main framing Z carrying the whole, the upper part F of the vessel A which answers as the diagram barrel for taking the diagrams on, being carried by a journal boss at F', in a bracket M', projecting from the main standard M bolted to the frame Z and carrying the driving gearing.

While the stirrer or agitator consists of a disk $L^2$, secured by an eye $L^6$ to the spindle L, L', and carrying a number of radial arms, preferably two annular rings or frames $a^{11}$ projecting down on each side of the lower arms $a^{10}$ the top part L' of the vertical spindle L is carried up through the top journal F', of the case F, as a hollow spindle with a bevel wheel $L^3$ on it actuated by a corresponding pinion $L^4$ on a first motion driving shaft C which is provided with fast and loose belt pulleys $C^2$, and $C^3$. In this case the water is fed to the kneading machine from a tube $b$ through the open top of the hollow shaft L', which has a hole or nozzle at $b^9$ for the escape of water to the kneading machine. The lower part of the casing has a pulley fitted on it, to make it act instead of the dynamometer and to which the one end of the chain D' is attached, and carried around a quadrant sector weighted lever $K^2$, analogous to that described in reference to Figs. 5 and 6, fulcrumed to adjustable screw stud centers at $K^5$ in brackets $K^{20}$, projecting down inside the main frame Z, but this chain or cord D' might be connected to any of the arrangements of springs E, described in the specification of the said former patent, and in reference to Figs. 1 to 4 of this specification. The mechanism is made to move a pencil $e$ and its carrying spring arm $e'$ at a uniform rate over the paper on the barrel F, the pencil being moved by a parallel traveling nut $f^8$ working on and actuated by the vertical screw spindle $f$ carried in a journal and footstep bearings in the bracket $f^4$ bolted to the bracket M' at the top, and actuated at a slow uniform rate by a large spur wheel $l$, on the spindle $f$ and pinion $l'$ on the upper end of the spindle L'. The varying action or heights of the diagram hereinbefore described as indicated by the lines $x$ $x$ are here produced by the varying action of the case A, and the weighted lever quadrant $K^2$. When this arrangement is used without the diagram barrel F a pointer may be used with an indicating dial on the top closed end of the case A. In this case also a pointer and divisions on the end or circumference of the barrel A, may be made to indicate the power being taken to knead the dough, and especially the maximum power taken, in the same manner as the pointer of a steam pressure gage indicates pressure, and analogous to that shown and described in reference to Fig. 9.

Instead of mounting the bosses F', $F^3$ of the barrel F, as previously described, they may as shown in section and end view Figs. 16 and 17, be mounted on antifriction pulleys $k^{10}$ carried in studs $k^{11}$ projecting from the pillow blocks $A^7$ carrying the axial shafts C or C' of the diagram barrel F.

The dynamometer D is improved to make it more suitable for mounting the said gearing wheel or wheels, or scroll cams or pulleys for the wire cord D' on the revolving axis for actuating the toothed racks, or other equivalent of the weights of the dynamometer hereinbefore described; and this improvement consists in forming one of the actuating shafts of the dynamometer D, preferably the driving shaft C hollow, while the driven shaft C' might either be solid or hollow, which actuates the agitators of the mixing machine A, and the hollow driving shaft C, might either be actuated by a belt pulley or pulleys $C^2$ mounted on it, or by gearing. In this arrangement, referring to Fig. 21, I mount within the hollow shaft C, a solid shaft or spindle $d^4$ having cross arms $d^3$, $d^3$, at its inner end carrying the axes of the bevel or spur pinions $d^2$, $d^2$ of the arrangement shown in Figs. 6 and 7 of and described in the specification of my said former patent, gearing into and within or between the driving wheel $d$ and the driven wheel $d'$ of the dynamometer D. The inner end of this solid shaft $d^4$ may either be overhung at the cross arms or have a journal $d^5$ on its extreme inner end, working into a hollow bearing in the adjacent end of the driven shaft $C'$, actuating the mixer A. This solid shaft $d^4$ would project out beyond the extreme end of the hollow driven shaft C, preferably carried on journal bearing blocks outside. On this projecting end of the solid shaft $d^4$ would be mounted very conveniently a grooved pulley $D^7$ for the cord $D'$, of any of the gearing for actuating the accumulative weights of the dynamometer.

I claim as my invention—

1. In an apparatus for testing and recording the properties of flour, the combination of a cylinder adapted to have a diagram paper mounted on its circumference and a dynamometer formed in one with the cylinder, with a traveling pencil to mark on the paper mounted on the circumference of the cylinder, substantially as and for the purposes set forth.

2. In an apparatus for testing and recording the properties of flour, the combination of a dynamometer and a dough mixer, with a water tube, a rod for varying the volume of liquid in the same, a pipe connection from the water tube to the mixer and means for delivering the water from the tube to the dough mixer at a uniform rate, substantially as and for the purposes set forth.

3. In an apparatus for testing and recording the properties of flour, the combination of a dynamometer, a dough mixer and inverted siphon or U-shaped water tube and devices for raising and lowering one arm of said tube, said devices being operated from the prime moving shaft of the apparatus, substantially as and for the purposes set forth.

4. In an apparatus for testing and recording the properties of flour, the combination of a dough mixer with a dynamometer, a variably acting quadrant lever and means for transmitting motion from the dynamometer cylinder to the circumference of and actuating said weighted quadrant lever, substantially as and for the purposes set forth.

In testimony whereof I have signed my name to this specification in the presence of two subscribing witnesses.

JAMES HOGARTH.

Witnesses:
   THOS. S. DUFFIE,
   R. C. THOMSON,
*Both of 96 Buchanan Street, Glasgow, Scotland, N. B.*